Oct. 8, 1968    W. A. ROMAIN    3,405,389
VEHICLE ADJUSTABLE WARNING LIGHT
Filed Jan. 3, 1966
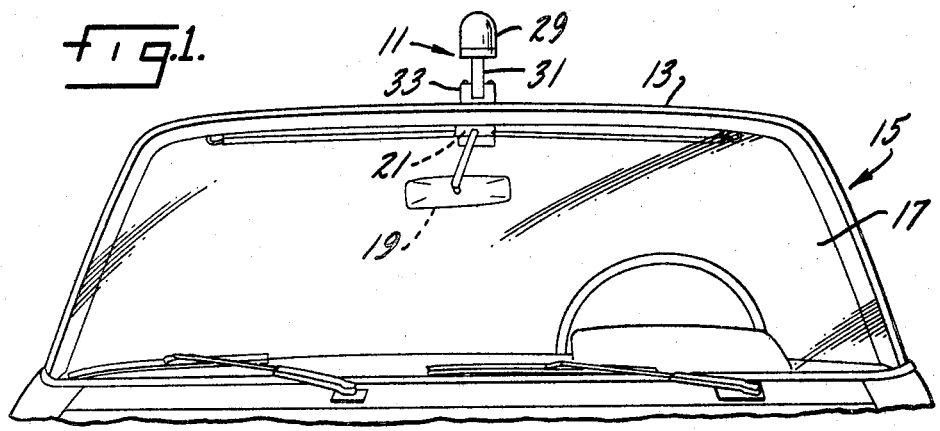
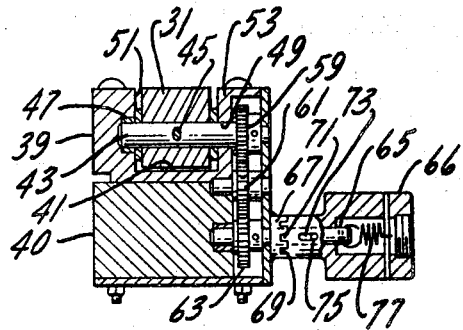
INVENTOR.
William A. Romain,
BY Parker & Carter
Attorneys.

United States Patent Office 3,405,389
Patented Oct. 8, 1968

3,405,389
VEHICLE ADJUSTABLE WARNING LIGHT
William A. Romain, Western Springs, Ill., assignor to Novo Industrial Corporation, New York, N.Y., a corporation of New York
Filed Jan. 3, 1966, Ser. No. 518,190
8 Claims. (Cl. 340—87)

This invention is concerned with a warning light for a vehicle and more specifically with a warning light that can be moved between a position in which it is visible in all directions and a lowered position in which it is concealed from view, especially from view to the rearward of the vehicle.

An object of this invention is a warning light adapted to be mounted on the roof of a vehicle and moveable from a position in which it is visible in all directions to a position of concealment in which it is located in the driver's blind spot to the front of the rearview mirror.

Another object is an adjustable warning light whose adjustment can be controlled from inside the vehicle.

Another object is an adjustable warning light which is automatically locked in its selected position after adjustment.

Another object is an adjustable warning light that can be easily moved between its operating and its retracted or concealed positions.

Another object is an adjustable warning light assembly that can be easily attached to the roof of a vehicle.

Another object is an adjustable warning light assembly for use on part-time emergency vehicles such as auxiliary police and volunteer fire vehicles which light assembly can be maintained in a concealed position except during the infrequent periods of emergency use.

Another object is an adjustable warning light assembly that can be lowered below the roof-line of the vehicle to reduce wind resistance of the vehicle and to increase speed and gas mileage of the vehicle.

Other objects may be found in the following specification, claims and drawings.

The invention is illustrated more or less diagrammatically in the following drawings in which:

FIGURE 1 is a partial perspective view of the front portion of a vehicle showing the hood, windshield and roof thereof;

FIGURE 2 is an enlarged partial side cross-sectional view of the vehicle of FIGURE 1 showing warning light and its mounting; and FIGURE 3 is a cross-sectional view taken along line 3—3 of FIGURE 2.

A warning light assembly 11 embodying the novel features of this invention is shown mounted on the roof 13 of a vehicle 15 in FIGURE 1 of the drawings. This vehicle has a front windshield 17 mounted forwardly of and extending downwardly from the roof 13. Located inside the vehicle and behind the windshield is a rearview mirror 19 which, in this instance, is shown attached to the underside of the roof at 21 and extending downwardly therefrom. The upper edge of the windshield 17 fits into a channel 23, which may be formed of rubber, and which in turn is supported on a flange 25 formed as part of the roof structure 13. For appearance sake, a molding reveal 27 may be inserted in the channel 23.

The warning light assembly 11 may include a dome shaped light structure 29 which projects one or more beams visible through a 360° arc mounted on an arm 31 which is pivotally connected to a base 33. The base 33 may be mounted in an opening 35 cut in the roof 13 and may be attached thereto by bolts 37. A gasket 38 may be provided between the base and the roof for waterproofing purposes.

The base 33 may be constructed in the form of a housing made in portions 39 and 40 and having a generally cubical exterior shape with a slot 41 formed in the upper portion 39 and adapted to receive the light supporting arm 31. The arm 31 may be affixed to a pivot pin 43 extending transversely across this slot by means of a key 45 with the pivot pin being journalled at 47 and 49 in the walls 51 and 53 forming the vertical sides of the slot. A stop surface 55 may be formed at the forward portion of the slot to engage and limit forward rotation of the arm 31 and a stop surface 57 may be formed at the rearward portion of the slot to engage and limit rearward movement of the arm. The rearward stop surface 57 may be inclined from the horizontal as is shown in FIGURE 2.

For purposes of rotating the pivot pin 43 and the attached warning light arm 31, a gear 59 is secured to one end of the shaft 43 inside of the base 33. Meshing with this gear 59 is an idler gear 61 also mounted in the housing which in turn meshes with a drive gear 63 located near the bottom of the housing portion 40. Keyed to the drive gear 63 is a shaft 65 extending outwardly of the housing and attached to this shaft is a knob 66 adapted to turn the drive gear 63 for purposes of rotating the arm 31 and light 29 between their forward and rearward positions.

To permit locking of the light arm 31 in any one of a variety of positions between its forward and rearward positions, the knob 66 is formed so that it can be locked in engagement with a collar 67 having serrations 69 which is secured to the outside of the base 33 and surrounds the shaft 65. The knob 66 is equipped with teeth 71 which can engage the serrations 69 in the collar 67. Longitudinal movement of the knob 66 relative to the shaft 65 to permit disengagement of the teeth and serrations is provided for by means of a slot 73 in the knob. A pin 75 projects from the shaft 65 and rides in the slot 73 of the knob. A spring 77 connected to the end of the shaft and to the knob biases said knob and its teeth into mesh with the serrations 69 of the collar 67.

For compactness, the arm 31 is bent at 79 so that the longitudinal axis of the light 29 forms an obtuse angle with the longitudinal axis of the arm 31. This angle is formed so as to be substantially equal to the angle between the roof 13 and the windshield 17 of the vehicle. The bending of the arm permits the light assembly to be folded into close relationship with the windshield and roof as is shown in outline in FIGURE 2. For additional stability of the light fixture in the concealed or folded position, the stop surface 55 and arm and light are arranged so that a portion of the light 29 contacts the reveal molding 27 when the light is in its lowered or concealed position.

The use, operation and function of this invention are as follows:

This invention is concerned with warning light assemblies for use on emergency vehicles and particularly on police vehicles used for traffic control in which it is desirable at times that the warning light not be visible to occupants of other vehicles and at other times that the warning light be visible. For example, when a police vehicle is patrolling a road for the purpose of detecting traffic violators, it is desirable that the light be in its position of least visibility so that the identity of the police vehicle cannot be readily ascertained. At other times, particularly when the warning light is in operation, it is desirable that it be highly visible.

For these reasons, the warning light assembly is constructed so that it can be moved from a position of maximum visibility above the roof of the vehicle to a position of minimum visibility in which it is folded forwardly and downwardly over the windshield of the vehicle. It is necessary for safe operation of the vehicle that the warning light in its folded position not unduly interfere with the vision of the operator of the vehicle. For this reason the warning light assembly is designed so that in its concealed position it will extend over the blind spot caused by the rearview mirror which is generally located in the center of the windshield slightly below the upper edge thereof. This lowered position of the light also offers the least obstruction to the view of the driver even in those automobiles in which the rearview mirror is mounted on the dashboard or in some position other than at the upper edge of the windshield.

At such times as the driver of the vehicle does not wish his warning light to be visible, it can be positioned as shown in outline in FIGURE 2, in which the arm 31 engages the lower stop surface 55 and the light structure 29 is located generally below the roof 13 and in front of the windshield 17. When the operator of the vehicle wishes to move the warning light to its position of maximum visibility, he can pull the knob 66 against its spring 77 so that its teeth 71 clear the serrations 69 in the collar 67. With the knob 66 moved to its outer position, it can be rotated so as to turn the shaft 43 and move the light support arm 31 through an arc from its forward position to its rearward position. The operator can continue rotation of the knob until the arm 31 engages the inclined stop surface 57 at the rear of the housing 33. With the arm in this position, the light 29 will be located in a generally vertical position above the roof 13. The operator can then release the knob 66 and its spring will return its teeth 71 into engagement with the serrations 69 of the collar 67 to hold the light in this rearward position. With the light in the rearward position, the operator can turn on a switch (not shown) to actuate the light. If desirable, the operator can maintain the warning light in the visible position even when it is not in operation and the combination of the stop 57 and the locking mechanism of the knob 66 will hold the light in this rearward position.

Whereas the mechanism for moving the warning light and arm between its position of maximum visibility and its concealed position has been shown as a particular type of gear mechanism, it should be understood that other mechanisms could be utilized to move the warning light between these positions. As an example and not by way of limitation, another mechanism that could be used to to accomplish this purpose is a Bowden wire.

Whereas, I have shown and described a preferred form of my invention with various details, it should be understood that alterations, modifications and substitutions can be made without departing from the essential theme thereof, and I, therefore, wish that the invention be unrestricted, except as by the appended claims.

I claim:

1. For use in a vehicle having a roof, a windshield located in front of and below said roof and a rearview mirror mounted behind said windshield and below said roof, a warning light assembly adapted to be mounted on said roof including:
   a base adapted to be attached to said roof,
   a warning light,
   an arm supporting said warning light being pivotally connected to said base and moveable between a rearward position in which said warning light is positioned above said roof and is visible from a position rearwardly of the vehicle to a forward position in which said warning light is located substantially below the roof of said vehicle and forward of the windshield, and
   means located inside of said vehicle for rotating said arm between said forward and rearward positions.

2. The structure of claim 1 further characterized in that means are provided to lock said light supporting arm in said forward and said rearward positions.

3. The structure of claim 1 further characterized in that said light supporting arm is inclined rearwardly when located in its rearward position and extends generally horizontally when in its forward position.

4. The structure of claim 1 further characterized in that said light supporting arm pivots about a horizontal axis extending transversely of the vehicle.

5. The structure of claim 1 further characterized in that said warning light extends substantially over said windshield when in said forward position.

6. The structure of claim 1 further characterized in that stop means are provided to limit rotation of said arm beyond said forward and said rearwardly positions.

7. The structure of claim 1 further characterized in that said warning light is located in front of said rearview mirror when in its forward position.

8. The structure of claim 1 further characterized in that said light supporting arm is bent at an angle approximately equal to the angle formed by the roof and the windshield.

No references cited.

JOHN W. CALDWELL, *Primary Examiner.*

ALVIN H. WARING, *Assistant Examiner.*